(12) United States Patent
Anubolu

(10) Patent No.: US 6,240,475 B1
(45) Date of Patent: May 29, 2001

(54) TIMER BASED ARBITRATIONS SCHEME FOR A PCI MULTI-FUNCTION DEVICE

(75) Inventor: Surendra Anubolu, Fremont, CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/001,245

(22) Filed: Dec. 30, 1997

(51) Int. Cl.$^7$ .................................................... G06F 13/14
(52) U.S. Cl. ........................................... 710/107; 710/113
(58) Field of Search ................................... 710/107, 240, 710/113, 241, 111, 112, 116, 117, 129, 25, 244, 40, 41, 45; 709/100–103, 223, 229; 711/100; 713/502

(56) References Cited

U.S. PATENT DOCUMENTS

| | | | |
|---|---|---|---|
| 5,301,329 | * | 4/1994 | Frame et al. . |
| 5,555,383 | * | 9/1996 | Elazar et al. . |
| 5,842,025 | * | 11/1998 | Joffe . |
| 5,948,094 | * | 9/1999 | Solomon et al. . |
| 6,006,303 | * | 12/1999 | Barnaby et al. . |

* cited by examiner

Primary Examiner—Gopal C. Ray
(74) Attorney, Agent, or Firm—Martine Penilla & Kim, LLP

(57) ABSTRACT

According to the present invention, a function timer is started whenever the PCI bus is granted to the function that did not access the PCI bus prior to the last bus idle state. The timer counts down to zero and waits until another function requests the PCI bus. During the time the timer is not zero, the current function will have the highest priority. Even if a PCI bus disconnect signal or retry signal forces the current function to deassert the request signal and start the request again, the current function is guaranteed to win the arbitration among the multiple contenders within the multi-function device. Since during the time slot, the same function will the granted access to the PCI bus, the next request will most likely be readily available from the PCI bridge's buffer which has additional data stored in anticipation for the next request. The use of the PCI bridge's buffer will maximize the system memory bus usage while increasing the PCI bus throughput. The time slot based arbitration according to the present invention rotates the priority to the other requesting function after the predetermined time expires which limits the latency for all the functions.

19 Claims, 7 Drawing Sheets

TIMER BASED ARBITRATIONS SCHEME FOR A PCI MULTI-FUNCTION DEVICE

BACKGROUND OF THE INVENTION

1. Field of the Invention

The present invention relates generally to computer input/output subsystems, and more particularly, to arbitration of peripheral component interconnect (PCI) bus based functions of multi-function add-on cards.

2. Description of the Related Art

A peripheral component interconnect (PCI) bus is commonly utilized in conventional computer systems. A PCI bus can couple various devices with other components of the computer system. For instance, the PCI bus may connect devices such as video cards or network cards to the processor memory of the computer system. The PCI bus is a standard in the computer industry and typically allows "plug-and-play" such that the PCI device coupled to the PCI bus configures itself without user intervention.

Typically, when a PCI device function requests data from another component of the computer system, for example from memory, additional data will be cached in anticipation for the next request based on the assumption that the next request will be for the next sequential amount of data. For instance, one cache line (typically 32 bytes for Intel machines) in addition to what was requested, can be retrieved and cached in anticipation for the next request.

PCI devices can be multi-functional such that a single device can perform several functions. Typically, most multi-function devices based on PCI local bus architecture use an internal arbiter for determining which device function will be allowed to use the PCI bus at a given time. For example, a PCI device can be a multi-function PCI device which includes more than one master device, for example, two Small Computer System Interface (SCSI) cards. Functions within these master devices may substantially simultaneously request use of the PCI bus. The arbitrator determines which function will obtain or retain the PCI bus. Arbitration has significant bearing on the system latency and performance since it decides which function will obtain the bus and how long that function will hold the bus.

There are typically two parameters to an arbitration scheme: throughput and latency. Throughput describes the amount of data which is transferred from the PCI device to the memory. Latency is typically an average time for the requesting function to obtain the PCI bus. It is desired to have a high throughput and a low latency.

A common method for determining which function will access the PCI bus is a method typically referred to as "round robin". The round robin method alternates priority of the functions. For example, if function zero obtains use of the PCI bus, then the next time function zero and function one substantially simultaneously request the PCI bus, then function one will have priority over function zero, and function one will obtain use of the PCI bus. However, using the round robin method with a PCI local bus architecture wastes the bandwidth of the data retrieval. The additional data which was cached is wasted since the first request was made by a first function while the next request was made by another function. The request made by the other function will most likely request data from a completely different address from that made by the first function. Accordingly, the additional data which was cached in anticipation for the next data request typically only applies to the first function which initially requested the data. For example, if function zero has obtained the use of the PCI bus and it has requested data near and up to address 1000, then the data retrieved would be the data up to address 1000 plus the next cache line (typically 32 bytes) after address 1000. The data up to address 1000 will be sent to function zero which requested it, while the extra cache line which was retrieved will be cached in anticipation for the next request from function zero which will most likely be the next cache line. However, in a round robin scheme, if both function zero and function one requests the PCI bus approximately simultaneously, then function one will obtain the use of the PCI bus, assuming function zero had priority the last time. Most likely, function one will request data from a completely different address, such as address 10,000. In this case, the data which has been cached in anticipation for function zero's next request has been wasted.

One possible solution to avoid wasting of the additional cached data in the PCI Bridge would be to allow function zero to finish the entire transaction which it has requested prior to transferring the use of the PCI bus to function one. However, if function zero is allowed to finished the entire transfer, latency will rise significantly since function one must wait until function zero finishes all its transfer. The increase in latency could be as much as one millisecond.

Another possible solution is to allow one of the functions to have a fixed priority such that the priority function obtains the PCI bus every time that particular function requests the bus. Fixed priority reduces latency for the higher priority devices. However, fixed priority causes the latency of the non-priority function to be very high and can cause the throughput of the non-priority function to be very low.

What is needed is a system and method which optimizes the three goals of having a high throughput, a low latency, and efficiently utilizing the caching scheme of the additional information. The present invention addresses such a need.

SUMMARY OF THE INVENTION

The present invention provides efficient arbitration between a plurality of functions in a PCI multi-function device which can work with a host memory. The method and system according to the present invention can maximize the PCI bus and system bus efficiency while implementing a fairness protocol which reduces the maximum latency for the PCI bus access by each function in a multi-function device.

A controller achieves the method and system according to the present invention by using a combination of rotating priority and time slot based priority. The time slots are assigned and the arbitration protocol is defined in such a way that each function can use the PCI bus 100% of the time if there are no requests pending from another function. A timer, which can be programmed via software, is implemented whose output influences the priority order at a given time. The timer's initial value is programmable by the host software.

According to the present invention, a function timer is started whenever the PCI bus is granted to the function that did not access the PCI bus prior to the last bus idle state. The timer counts down to zero and waits until another function requests the PCI bus. During the time the timer is not zero, the current function will have the highest priority. Even if a PCI bus disconnect signal or retry signal forces the current function to deassert the request signal and start the request again, the current function is guaranteed to win the arbitration among the multiple contenders within the multi-function device. Since during the time slot, the same function will the granted access to the PCI bus, the next request will most likely be readily available from the PCI bridge's buffer which has additional data stored in anticipation for the next request. The use of the PCI bridge's buffer will maximize the system memory bus usage while increasing the PCI bus throughput. The time slot based arbitration according to the present invention rotates the priority to the other requesting function after the predetermined time expires which limits the latency for all the functions.

A system and method according to the present invention for providing arbitration between a plurality of functions in a computer system comprises the steps of providing a first function; providing a second function; determining whether a predetermined time period has expired; and changing priority from the first function to the second function if the predetermined time period has expired.

DETAILED DESCRIPTION OF THE PREFERRED EMBODIMENTS

The following description is presented to enable one of ordinary skill in the art to make and to use the invention and is provided in the context of a patent application and its requirements. Various modifications to the preferred embodiments will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
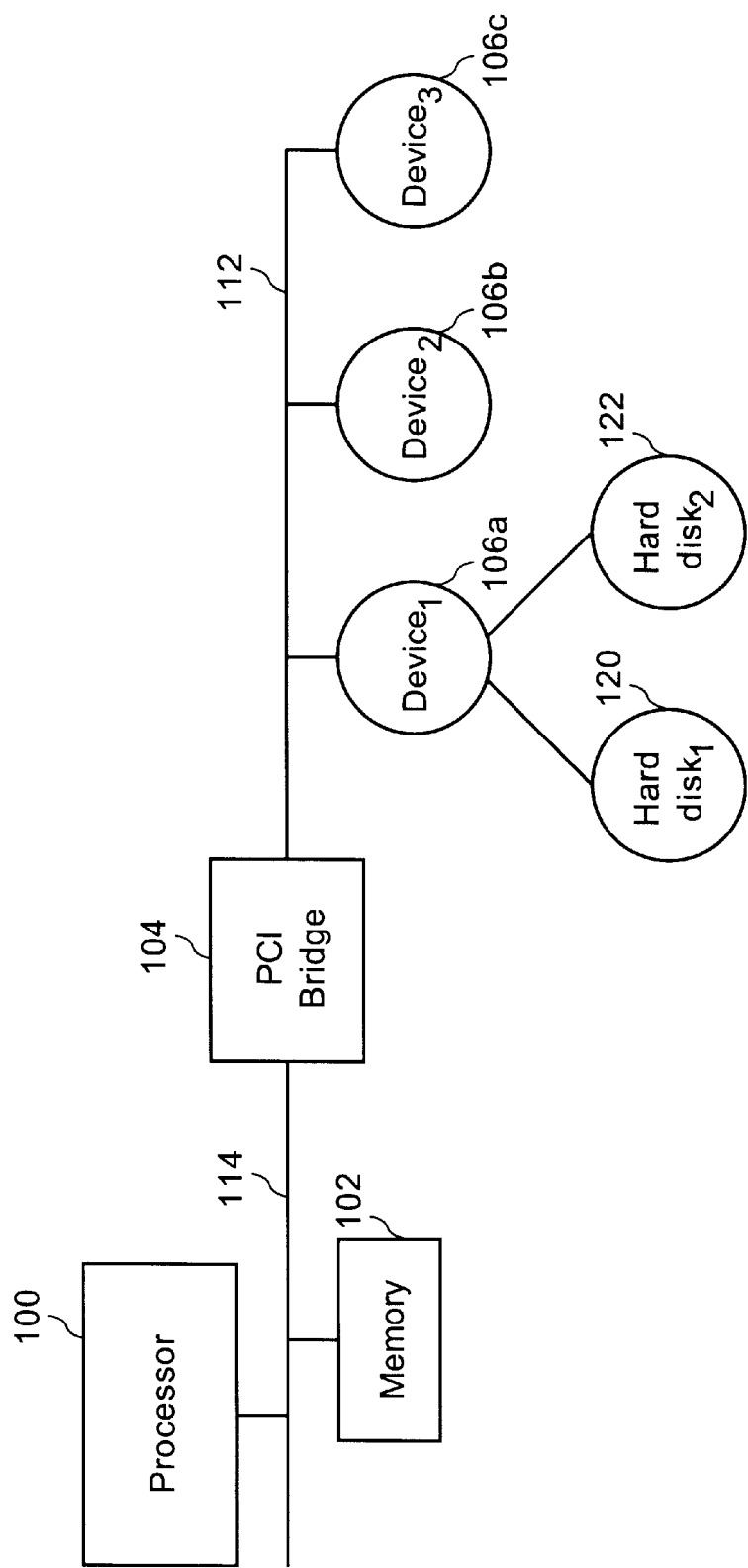
FIG. 1 is a block diagram of a computer system utilizing a PCI local bus in which the present invention can reside.

FIG. 1 is a block diagram of a system utilizing a PCI bus in which the present invention can reside. The system of FIG. 1 shows a processor 100, a memory 102, a peripheral component interconnect (PCI) bridge 104, and several PCI devices 106a–106c. The processor 100 is shown to be coupled with the memory 102 via a bus 114. The bus 114 is also coupled to the PCI bridge 104 which bridges the protocol between bus 114 and the PCI bus 112. The PCI bridge 104 also includes at least one buffer (not shown) to cache additional data in anticipation for the next request for data. The PCI bus 112 can connect several PCI devices. Examples of PCI devices include a video card, a hard disc controller, and a network card. These PCI devices are typically "plug-and-play" such that it configures itself without user intervention. PCI devices can be coupled to several hard discs such as hard disc 120 and hard disc 122, as shown being coupled to PCI device 106a.

Figure 2:
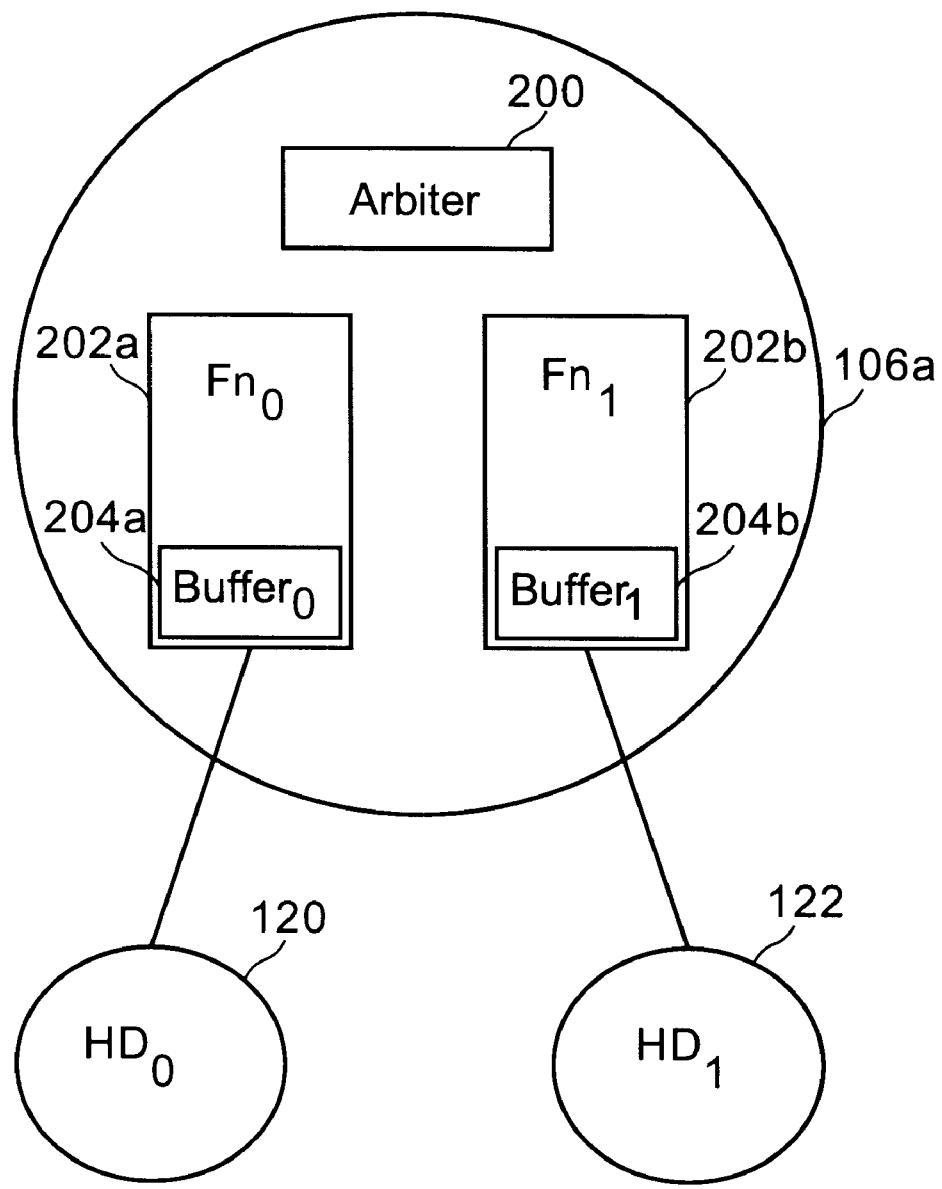
FIG. 2 is a block diagram showing details of a PCI device.

FIG. 2 is a more detailed diagram of the PCI device 106a. The PCI device 106a is shown to include an arbiter 200 coupled with multiple PCI device functions, in this example, function 202a and function 202b. Included in function 202a and function 202b are buffer 204a and buffer 204b, respectively. The hard disc 120 and hard disc 122 can transfer data into the function buffers 204a and 204b, typically up to 80 megabytes per second.

Figure 3:
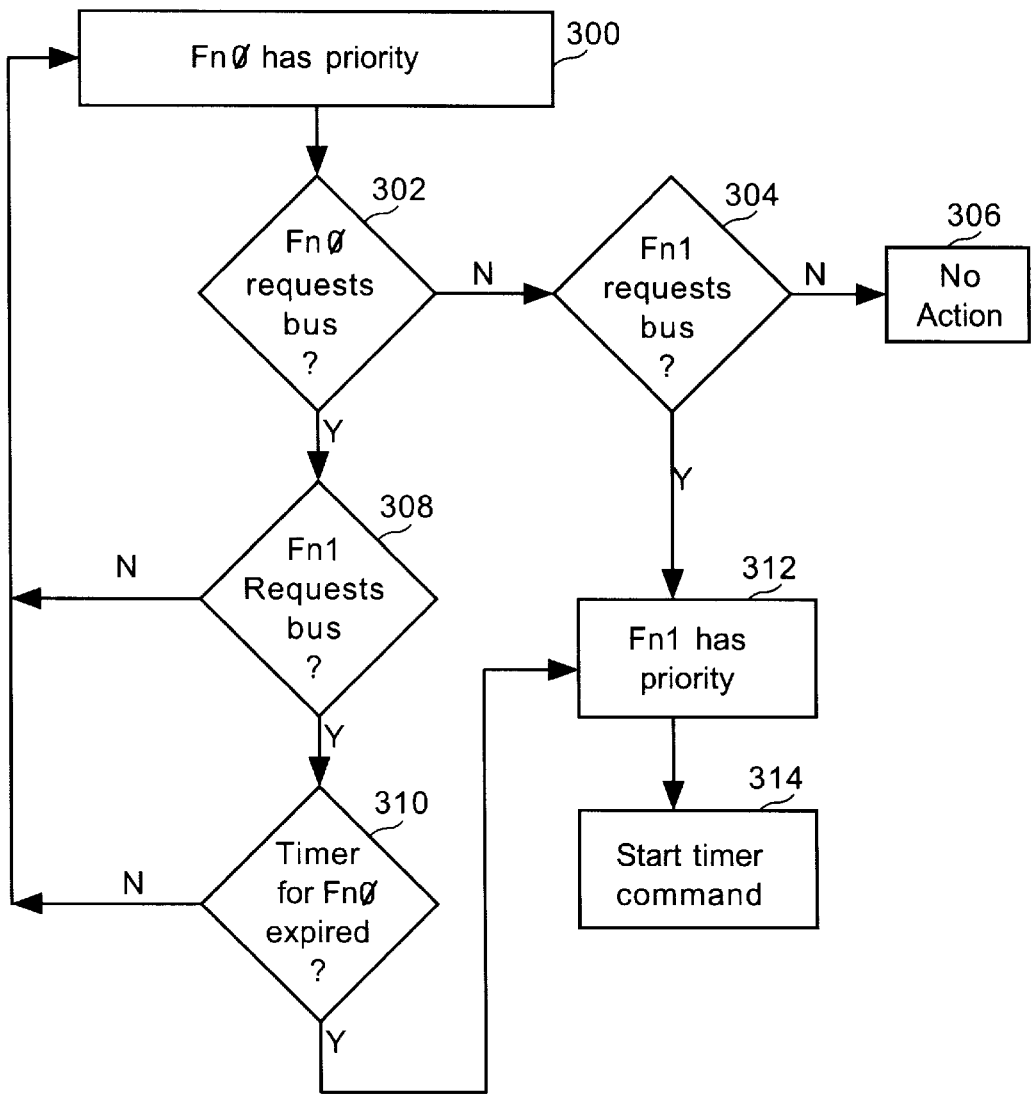
FIG. 3 is a flow diagram of a method according to the present invention for arbitrating between functions.

FIG. 3 is a flow diagram of an example of a method according to the present invention for arbitrating between functions. In this example, it is initially assumed that one of the functions, function zero initially has priority via step 300. It is determined whether function zero has requested the PCI bus via step 302. If function zero has not requested the PCI bus, then it is determined whether function one has requested access to the PCI bus via step 304. If neither function zero nor function one has requested access to the PCI bus, then no action is taken via step 306. If, however, function zero has not requested access to the PCI bus via step 302 and function one has requested access to the PCI bus via step 304, then function one is given priority via step 312. A timer is then initiated via step 314.

If function zero has requested access to the PCI bus via step 302, then it is determined whether function one has requested access to the PCI bus via step 308. If function zero has requested access to the PCI bus via step 302 but function one has not requested access to the PCI bus via step 308, then function zero is given priority via step 300. If, however, function zero has requested access to the PCI bus via step 302 and function one has also requested access to the PCI bus via step 308, then it is determined whether the timer for function zero has expired via step 310. If the timer has not expired for function zero, then function zero retains priority via step 300. If, however, the timer has expired for function zero via step 310, then function one is given priority via step 312. A timer is then initiated for function one via step 314.

Figure 4:
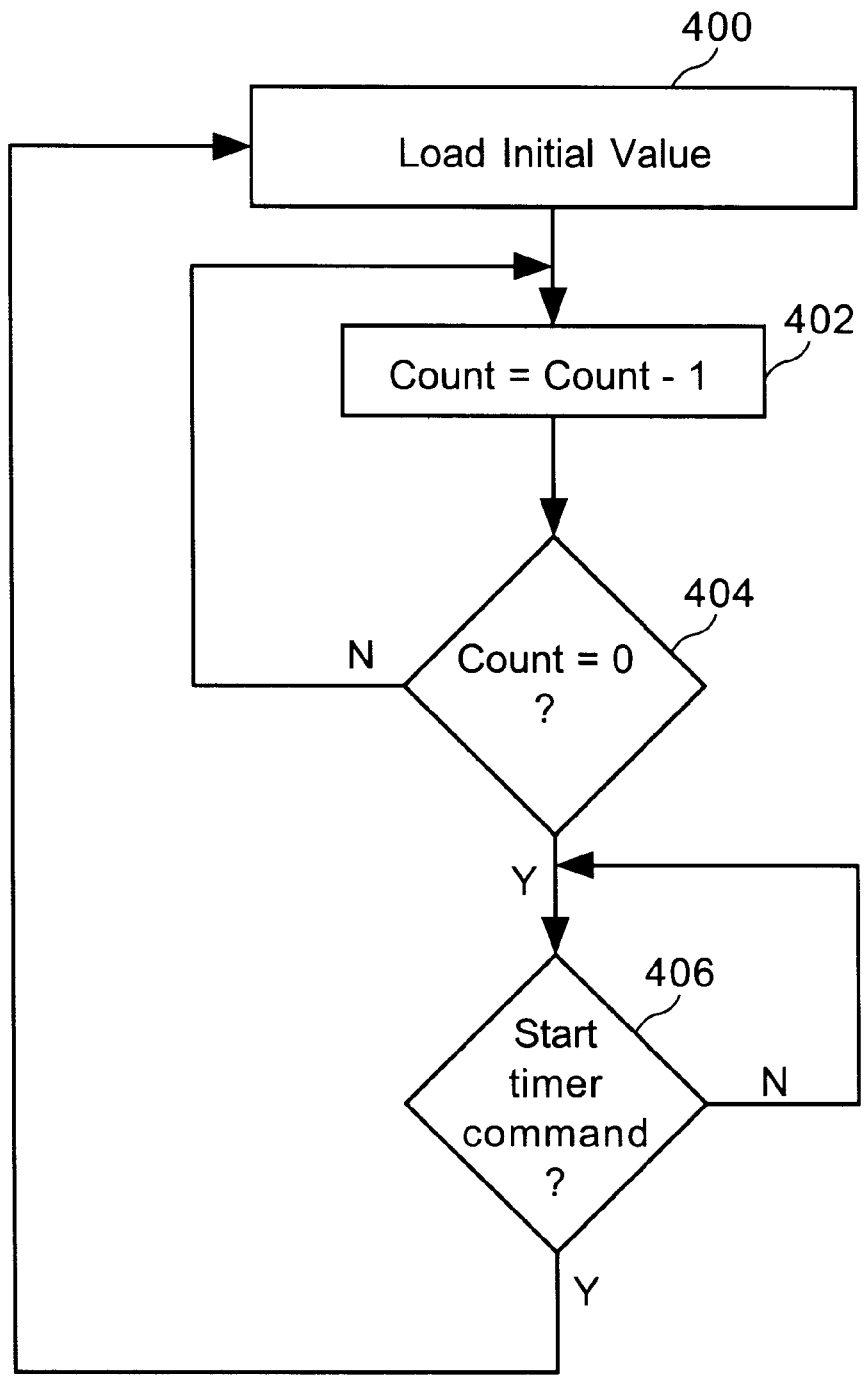
FIG. 4 is a flow diagram of a timer command as shown in FIG. 3.

FIG. 4 is a flow diagram showing details of a step of initiating and counting down the timer via step 314 of FIG. 3. Initial value is loaded via step 400. The count from the initial value is subtracted by one via step 402. It is then determined whether the count equals zero via step 404. If count does not equal zero, then one is subtracted from the count via step 402. If count does equal zero via step 404, then it is determined whether the timer command has been initiated via step 406. If not, then it is again determined whether the timer command has been initiated via step 406. If the timer command has been initiated, then the initial value is loaded via step 400.

During the time the timer is not zero, the current function will have the highest priority. Even if the PCI bus disconnect or retry signal forces the current function to deassert the request signal and start the request again, the current function is guaranteed to win the arbitration among the multiple contenders within the multi-function device.

Figure 5:
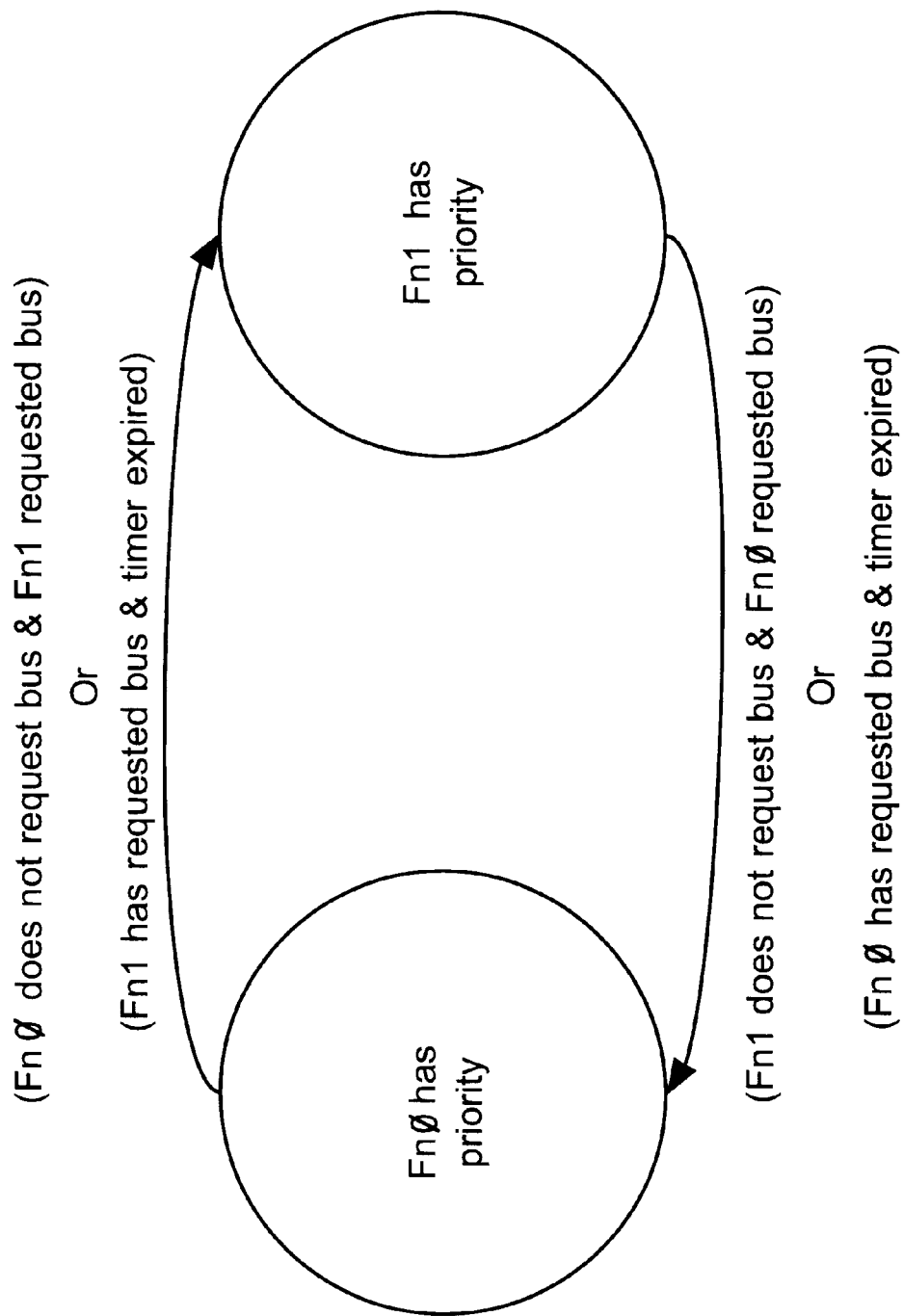
FIG. 5 is a state diagram showing the change in priority between two functions.

FIG. 5 is a state diagram showing the changing of priority between function zero and function one. If function zero has priority, then the priority changes from function zero to function one if function zero does not request access to the PCI bus and function one requests access to the PCI bus. Another way by which priority changes from function zero to function one is if function one has requested access to the PCI bus and the timer for function zero has expired. Priority changes from function one to function zero if function one does not request access to the PCI bus and function zero has requested access to the PCI bus. Another way by which priority changes from function one to function zero is if function zero has requested access to the PCI bus and the timer for function one has expired.

Figure 6A:
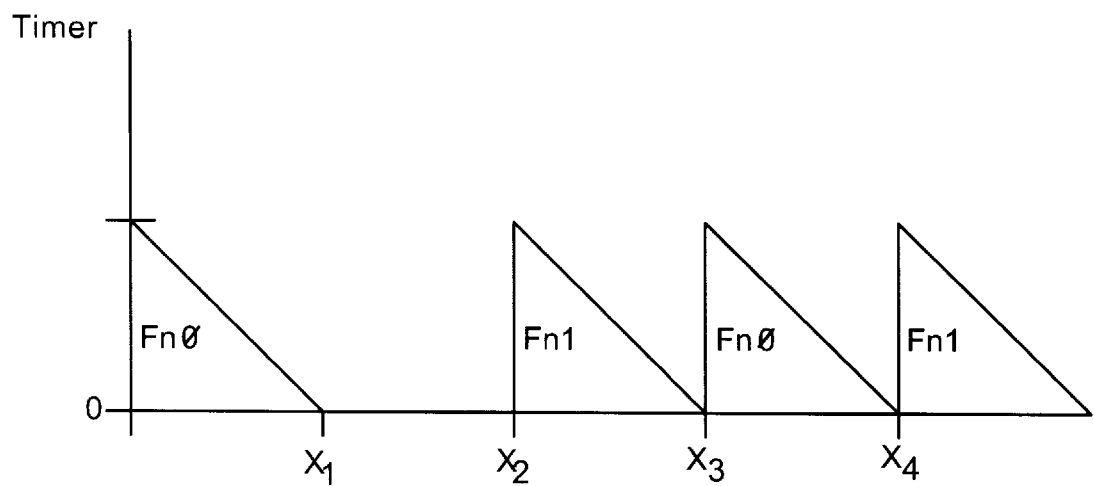
FIGS. 6A and 6B are graphs showing the flow of the timer according to the present invention.
Figure 6B:
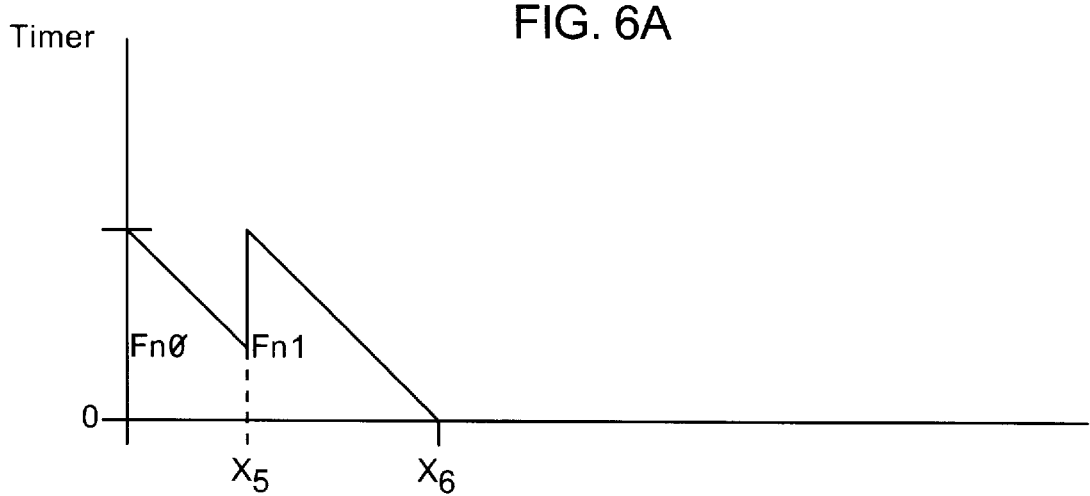

FIGS. 6A and 6B show timing diagrams of the timer. FIG. 6A shows an example of when a request for access to the PCI bus does not occur until after the timer for the function which currently has access to the PCI bus expires. In this example, assume function zero initially has priority or access to the PCI bus. When function zero gains priority, the timer is initiated. At time X1, the timer has expired. However, at time X1, function one has not requested access to the PCI bus. At time X2, a request from function one occurs for access to the PCI bus. Up until time X2, function zero retains priority since function one had not requested access to the PCI bus. Function zero retains priority until function one requests priority despite the fact that the timer for function zero had expired at time X1. At time X2, the priority shifts from function zero to function one, and the function one timer is initiated. At time X3, function one timer expires. If some time between time X2 and time X3 a request for priority occurs from function zero, then function zero obtains priority at time X3 since the timer for function one expires at time X3. Priority is shifted to function zero even if function one has not completed its requested transaction at time X3. Function one must wait until after the timer for function zero expires at time X4, in which case, function one will regain priority.

FIG. 6B shows an example of when the function with the priority completes its transaction prior to the expiration of its timer. In this example, function zero initially has priority. Prior to the expiration of its timer, function zero completes its transaction at time X5. At time X5, it is determined that function one had at some time, prior to time X5, requested access to the PCI bus. Accordingly, function one is given priority and the timer for function one is initiated at time X5.

Figure 7:
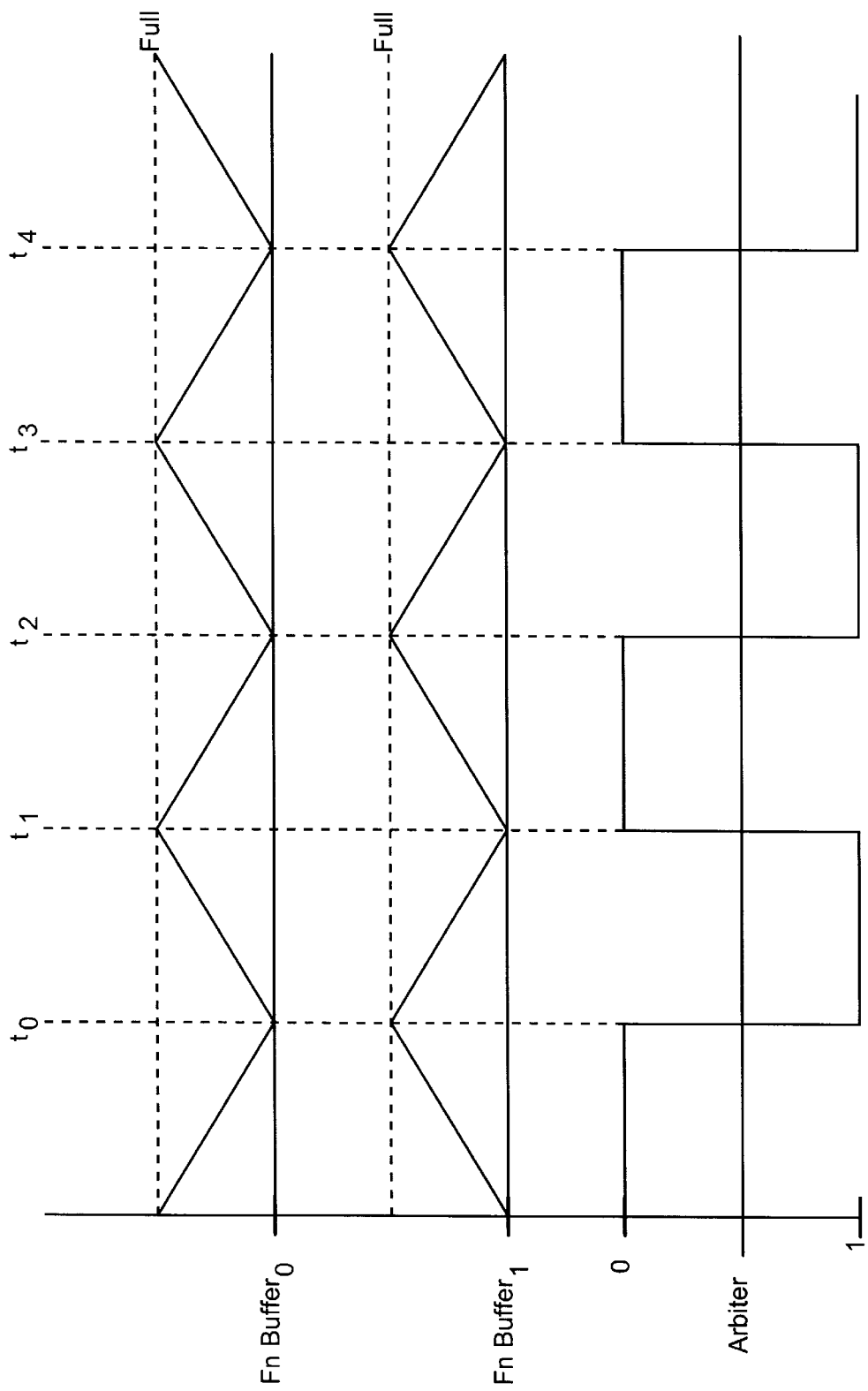
FIG. 7 is a graph of function buffers and an arbiter versus time.

FIG. 7 shows a diagram of function buffers zero and one versus time. Additionally, FIG. 7 shows priority selections of the arbiter at various times. In this example, the function buffer zero, as shown in FIG. 2, is shown to be initially full. The function zero is assumed to have initial priority in the example shown in FIG. 7. Since function zero has access to the PCI bus, the contents of its function buffer is being transferred. The contents of the function buffer zero is being transferred at a maximum speed of approximately 266 megabytes per second. At the same time, function one, which does not have access to the PCI bus prior to T0, is having its buffer filled by hard disc one 122 as shown in FIG. 2. The hard disc can transfer data into the function buffers at a typical maximum speed of approximately 80 megabytes per second. Accordingly, the contents of the function buffers can be transferred out via the PCI bus faster than it can be transferred in by the hard discs.

The arbiter axis indicates that function zero has priority prior up to T0. At T0, the function buffer is at some point less than full due to the faster transfer out speed of the PCI bus compared to the transfer in speed of the hard disc. At T0, the arbiter transfers priority to function one and function buffer zero begins to fill from the hard disc input. Although the hard disc is continuously writing into function buffer one between T0 and T1, the contents of function buffer one is being transferred out by the PCI bus faster than data is being transferred in by the hard disc. At T1, the priority again switches to function zero in this example.

FIG. 7 illustrates that one of the advantages of the system and method according to the present invention for arbitrating between functions is that the hard drive can substantially continuously write into the function buffers. It effectively avoids the hard disc having to wait until it receives priority to transfer contents out of the function buffer so that buffer space can be vacated for the hard disc to continue to write into the function buffer. The system and method according to the present invention provides optimized priority time slots such that it allows substantial continuous writing into the function buffers by the hard discs.

The preferred priority time slot depends on the function buffer size. An example of the formula for a preferred time is as follows:

(0.75)*(hard disc transfer period)*(function buffer size)=(priority time slot)

The first number is preferred to be within the range of 0.7 to 0.8, however, it can vary widely. The hard disc transfer period, or CD ROM transfer period is typically approximately 25 nanoseconds, but can range within approximately 100–12.5 nanoseconds. The function buffer size is typically 256 bytes to 1 kilobyte.

Although the present invention has been described in accordance with the embodiment shown, one of ordinary skill in the art will readily recognize that there could be variations to the embodiment and these variations would be within the spirit and scope of the present invention. Accordingly, many modifications may be made by one of ordinary skill in the art without departing from the spirit and scope of the appended claims.

What is claimed is:

1. A method for providing arbitration between a plurality of functions in a computer system, the method comprising:

providing a first function having priority to a system resource;

providing a second function;

determining whether a predetermined time period has expired; and allowing the first function to have priority to the system resource when the predetermined time period has expired if the second function has not requested priority to the system resource; and changing priority to the system resource from the first function to the second function if the predetermined time period has expired and if the second function has requested priority to the system resource.

2. The method of claim 1, further comprising a step of determining whether the second function requests priority.

3. The method of claim 1, further comprising a step of changing priority from the first function to the second function if the first function completes a transaction prior to the expiration of the predetermined time period.

4. The method of claim 1, further comprising a step of changing priority from the first function to the second function if the first function completes a transaction prior to the expiration of the predetermined time period and if the second function requests priority.

5. The method of claim 1, wherein the system resource is a bus.

6. The method of claim 5, wherein the bus is a peripheral component interconnect (PCI) bus.

7. A method for providing arbitration between a plurality of functions in a computer system, the method comprising:

providing a first function having priority to a system resource;

providing a second function;

determining whether the second function has requested priority to the system resource;

determining whether a predetermined time period has expired; and allowing the first function to have priority to the system resource when the predetermined time period has expired if the second function has not requested priority to the system resource; and changing priority to the system resource from the first function to the second function if the predetermined time period has expired and if the second function has requested priority to the system resource.

8. The method of claim 7, further comprising a step of changing priority from the first function to the second function if the first function completes a transaction prior to the expiration of the predetermined time period.

9. The method of claim 7, further comprising a step of changing priority from the first function to the second function if the first function completes a transaction prior to the expiration of the predetermined time period and if the second function requests priority.

10. The method of claim 7, wherein the system resource is a bus.

11. The method of claim 10, wherein the bus is a peripheral component interconnect (PCI) bus.

12. A system for providing arbitration between a plurality of functions in a computer system, the system comprising:
   a first function having priority to a system resource;
   a second function;
   logic that determines whether a predetermined time period has expired;
   logic that allows the first function to have priority to the system resource when the predetermined time period has expired if the second function has not requested priority to the system resource; and
   logic that changes priority to the system resource from the first function to the second function if the predetermined time period has expired and if the second function request priority to the system resource.

13. The system of claim 12, further comprising logic that determines whether the second function requests priority to the system resource.

14. The system of claim 12, further comprising logic that changes priority from the first function to the second function if the first function completes a transaction prior to the expiration of the predetermined time period.

15. The system of claim 12, further comprising logic that changes priority from the first function to the second function if the first function completes a transaction prior to the expiration of the predetermined time period and if the second function requests priority.

16. The system of claim 12, wherein the system resource is a bus.

17. The system of claim 16, wherein the bus is a peripheral component interconnect (PCI) bus.

18. A system for providing arbitration between a plurality of functions in a computer system, the system comprising:
   a processor;
   a peripheral component interconnect (PCI) bridge coupled to the processor; and
   a device coupled to the PCI bridge, wherein the device includes a first function and a second function, and wherein the first function is allowed to have priority to a system resource when a predetermined time period has expired if the second function has not requested priority to the system resource, and further wherein priority to the system resource changes from the first function to the second function if the predetermined time period has expired and if the second function request priority to the system resource.

19. The system of claim 18, wherein the priority is changed from the first function to the second function if the first function completes a transaction prior to the expiration of the predetermined time period and if the second function requests priority.

* * * * *